US012594881B2

(12) United States Patent
Uemura et al.

(10) Patent No.: US 12,594,881 B2
(45) Date of Patent: Apr. 7, 2026

(54) DATA PROCESSING DEVICE AND DATA PROCESSING METHOD

(71) Applicant: Faurecia Clarion Electronics Co., Ltd., Saitama (JP)

(72) Inventors: Takahiro Uemura, Saitama (JP); Tatsuya Omura, Saitama (JP); Yuki Matsushita, Saitama (JP); Keiichiro Yoshihara, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 198 days.

(21) Appl. No.: 18/457,570

(22) Filed: Aug. 29, 2023

(65) Prior Publication Data

US 2024/0075874 A1 Mar. 7, 2024

(30) Foreign Application Priority Data

Aug. 30, 2022 (JP) ................................. 2022-137170

(51) Int. Cl.
B60Q 3/70 (2017.01)
B60Q 3/14 (2017.01)
B60Q 3/18 (2017.01)

(52) U.S. Cl.
CPC ................. B60Q 3/70 (2017.02); B60Q 3/14 (2017.02); B60Q 3/18 (2017.02)

(58) Field of Classification Search
CPC ...... B62D 15/027; B60K 35/81; B60K 35/60; B60K 35/233; B60K 35/80; B60K 35/285; G06V 20/59; G06V 40/28; G06V 20/597; G09G 5/026; G02B 27/0149; G02B 27/0101; G02B 5/0263; G02B 27/01; G02B 26/101; F21S 43/33; G08G 1/166; G08G 1/167; G01C 21/365; B60Q 1/143

See application file for complete search history.

(56) References Cited

U.S. PATENT DOCUMENTS 11,175,501 B2 * 11/2021 Ogata .................. G02B 26/101
2009/0231116 A1 * 9/2009 Takahashi .............. G02B 27/01
340/461

(Continued)

FOREIGN PATENT DOCUMENTS

JP 2007-080060 A 3/2007

*Primary Examiner* — Yuri Kan
(74) *Attorney, Agent, or Firm* — Volpe Koenig

(57) ABSTRACT

A data processing device for performing suitable feedback with regard to a pointing gesture of a vehicle occupant is provided. The occupant state recognition unit recognizes motion of an occupant of the vehicle pointing to outside the vehicle. The peripheral conditions acquisition unit acquires the peripheral circumstances around the vehicle. The target recognition unit recognizes a target pointed at by the occupant based on recognition results obtained by the occupant state recognition unit and recognition results obtained by the peripheral conditions acquisition unit. The light emitting unit has a long shape and is installed above or below a windshield of the vehicle over a vehicle body width direction. The light emission control unit controls, in two stages, a luminescence mode for a portion of the light emitting unit corresponding to a direction pointed at by the occupant and/or a direction in which the target is located.

7 Claims, 4 Drawing Sheets

(56)     References Cited

U.S. PATENT DOCUMENTS

| | | | | |
|---|---|---|---|---|
| 2009/0254247 A1* | 10/2009 | Osanai | B60Q 1/143 | |
| | | | 701/1 | |
| 2012/0268351 A1* | 10/2012 | Sasaki | G01C 21/365 | |
| | | | 345/8 | |
| 2013/0241747 A1* | 9/2013 | Hatakeyama | G08G 1/167 | |
| | | | 340/901 | |
| 2013/0249395 A1* | 9/2013 | Hatakeyama | B60K 35/80 | |
| | | | 315/77 | |
| 2013/0249684 A1* | 9/2013 | Hatakeyama | G02B 27/01 | |
| | | | 340/435 | |
| 2013/0258488 A1* | 10/2013 | Hatakeyama | G02B 5/0263 | |
| | | | 359/630 | |
| 2014/0132407 A1* | 5/2014 | Kumai | G08G 1/166 | |
| | | | 340/439 | |
| 2016/0379498 A1* | 12/2016 | Aoki | B60K 35/233 | |
| | | | 340/436 | |
| 2019/0121522 A1* | 4/2019 | Davis | G06V 40/28 | |
| 2019/0234585 A1* | 8/2019 | Le Corre | F21S 43/33 | |
| 2019/0291640 A1* | 9/2019 | Hanya | B60K 35/60 | |
| 2019/0346674 A1* | 11/2019 | Miyake | G02B 27/0101 | |
| 2019/0346713 A1* | 11/2019 | Miyake | G02B 27/0149 | |
| 2020/0126510 A1* | 4/2020 | Shiokawa | G09G 5/026 | |
| 2024/0190338 A1* | 6/2024 | Uemura | G06V 20/59 | |
| 2025/0135885 A1* | 5/2025 | Hayashi | B60K 35/81 | |

* cited by examiner

FIG. 3

| Recognition Stages | Pattern 1 | Pattern 2 | Pattern 3 | Pattern 4 |
|---|---|---|---|---|
| (1) Recognition of a hand of an occupant | No Luminescence | No Luminescence | No Luminescence | No Luminescence |
| (2) Recognition of finger pointing gesture | | First Luminescence Mode | First Luminescence Mode | First Luminescence Mode |
| (3) Recognition of pointing direction | First Luminescence Mode | | Second Luminescence Mode | Second Luminescence Mode |
| (4) Recognition of pointing target | Second Luminescence Mode | Second Luminescence Mode | | Third Luminescence Mode |

DATA PROCESSING DEVICE AND DATA PROCESSING METHOD

TECHNICAL FIELD

The present invention relates to a data processing device and a data processing method.

BACKGROUND ART

Conventionally, there is a technology for identifying target objects pointed to by a user who is occupant of a vehicle. For example, Patent Document 1 states, "a target object identifying device that accurately identifies a target object that exists in a direction to which a user's hand or finger is pointing is provided", and also states that "Positioning unit 13 detects a current vehicle position and vehicle orientation. An imaging unit 18 images the surroundings of the vehicle. A pointing direction detecting unit 16 detects a pointing direction pointed by the user in the vehicle using their hand. A target object extracting unit extracts target objects that exist in the pointing direction detected by the pointing direction detecting unit 16 from the image captured by the imaging unit 18. The target object position identifying unit identifies the position of the target object extracted by the target object extracting unit with respect to the vehicle".

PRIOR ART DOCUMENTS

Patent Documents

Patent Document 1: JP2007-080060 A

SUMMARY OF THE INVENTION

Problem to be Solved by the Invention

Conventional technology is not able to provide feedback to an occupant as to how an in-vehicle device recognizes a finger pointing gesture by an occupant of a vehicle. For example, when a driver points at a target through a windshield, it is desirable that an in-vehicle device provides feedback as to recognition of a pointed direction or recognition of a pointed target to the occupant, in order to establish the interaction. Furthermore, this feedback must be performed without impeding the driver's visual confirmation of the surroundings.

Therefore, an object of the present invention is to provide a data processing device and a data processing method for providing suitable feedback to an occupant of a vehicle.

Means for Solving the Problem

In order to achieve the above object, one typical data processing device of the present invention includes an occupant state recognition unit that recognizes a motion of a vehicle occupant pointing to the outside of the vehicle, a peripheral conditions acquisition unit that acquires the condition of the surroundings of the vehicle, a target recognition unit that recognizes a target pointed at by the occupant based on recognition results of the occupant state recognition unit and acquisition results of the peripheral conditions acquisition unit; and a light emission control unit connected to an elongated light emitting unit installed above or below a windshield of the vehicle across a vehicle body width direction, and configured to control a luminescence mode of a portion of the light emitting unit corresponding to a direction pointed to by the occupant and/or a direction in which the target is located in at least two stages, based on recognition results of the occupant state recognition unit and/or recognition results of the target recognition unit.

Effect of the Invention

The present invention can provide suitable feedback with regard to a finger pointing gesture by the occupant of the vehicle. The following description of embodiments will elucidate the problems, configurations, and effects other than those described above.

BRIEF DESCRIPTION OF THE DRAWINGS

FIG. 3 is an explanatory diagram of control of the luminescence mode.

EMBODIMENTS OF THE INVENTION

Examples will be described below with reference to the drawings.

Example 1

Figure 1:
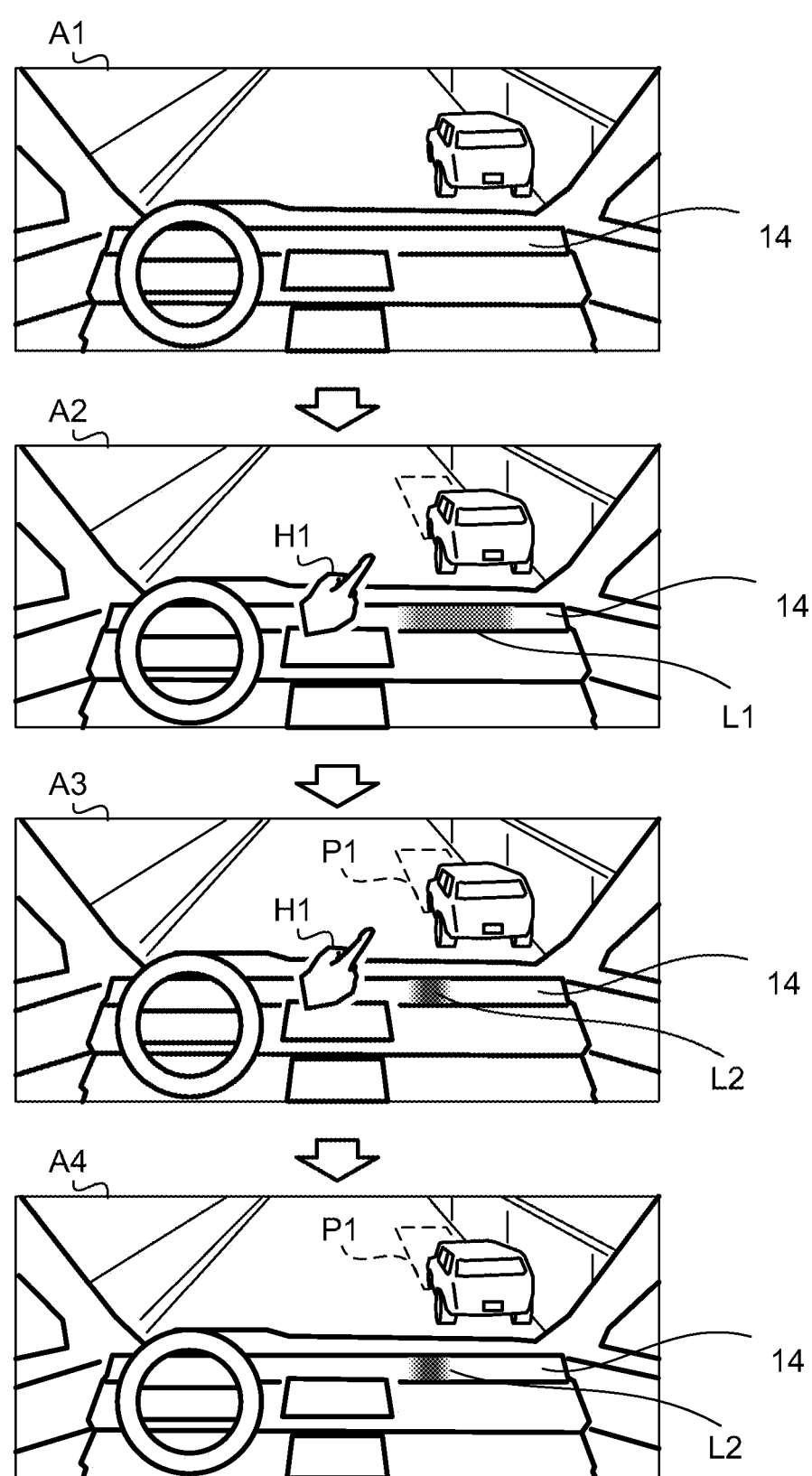
FIG. 1 is an explanatory diagram describing an overview of operation and action of data processing of Example 1.
Figure 2:
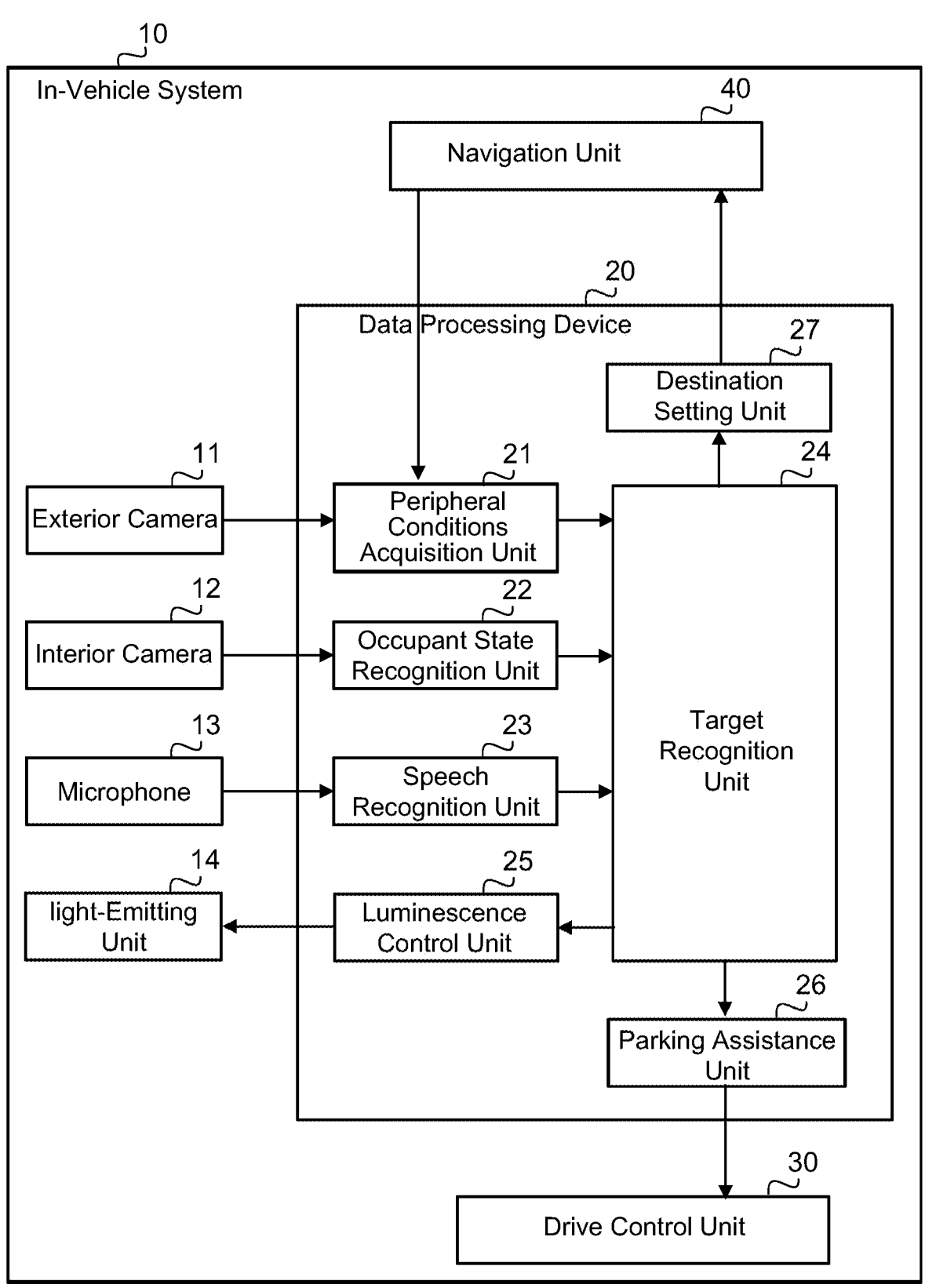
FIG. 2 is a configuration diagram of an overall in-vehicle system including the data processing device of Example 1.

FIG. 1 is an explanatory diagram describing an overview of operation and action of data processing of Example 1. Furthermore, FIG. 2 is a configuration diagram of an overall in-vehicle system 10 including the data processing device 20 of Example 1. The in-vehicle system 10 provided in the vehicle is equipped with a data processing device 20, an interior camera that captures images of the interior of the vehicle, and an exterior camera that captures images of the surroundings of the host vehicle. Furthermore, an oblong shaped light emitting unit 14 is provided below the windshield of the vehicle so as to extend across the vehicle body width direction (A1). The light emitting unit 14, for example, uses an LED (Light Emitting Diode) that intentionally displays at a low resolution.

The data processing device 20 acquires an image from the interior camera, and recognizes the state of the vehicle occupant who is the user. For example, when the occupant points outside of the vehicle, the data processing device 20 analyzes the images of the interior camera in order to identify the eye position and finger position of the occupant, and determines that a straight line connecting the eye position and fingertip is the pointing direction. Herein, the term "finger" is used to include at least one of a hand and a finger.

The data processing device 20 that has recognized pointing by the occupant causes a portion of the light emitting unit 14 including the direction pointed at by the occupant (pointing direction) to emit light in a band of width L1 (A2).

Furthermore, the data processing device 20 acquires the peripheral circumstances around the vehicle using images from the exterior camera and the like. The data processing device 20 extracts candidates that can be pointed at by the occupant from the peripheral circumstances around the vehicle, and identifies the relative direction of each candidate with regard to the vehicle. Furthermore, when the relative direction of any candidate substantially matches the pointing direction, the candidate is recognized as the target pointed at by the occupant (pointing target).

The data processing device 20 that has recognized the pointing target causes a portion of the light emitting unit 14 including the direction of the pointing target to emit light in a band of width L2 (A3). Herein, the width L2 is sufficiently narrower than the width L1. In FIG. 1, the occupant points to the parking region P1, and the data processing device 20 causes a portion of the light emitting unit 14 corresponding to the direction of the parking region P1 to emit light in a band.

Thereafter, when the occupant stops pointing, the data processing device 20 continues light emission in a band of width L2 in the direction of the parking region P1 for a prescribed period of time (A4), and then ends light emission.

In this manner, the data processing device 20 can provide feedback of the progress of recognition of the pointing action by the occupant, by a gradual change in the light emitting mode. Since the change in the luminescence mode below the windshield is used, the occupant can check the feedback from the data processing device 20 through the light emitting unit 14 in the peripheral vision field while directly viewing the surroundings of the vehicle though the windshield.

In FIG. 2, the data processing device 20 is connected to a drive control unit 30 and a navigation unit 40. The drive control unit 30 is a unit that controls acceleration/deceleration and steering of the host vehicle. The navigation unit 40 of the vehicle is a unit that identifies the position of the host vehicle, references the map database, and searches for and guides the route of the vehicle. The map database can be used as a target object database that accumulates the position of targets that may be pointed at by the occupant.

The data processing device 20 is connected to an exterior camera 11, an interior camera 12, a microphone 13, and a light emitting unit 14 of the in-vehicle system 10. The exterior camera 11 is an imaging device that captures the surroundings of the vehicle. The interior camera 12 is an imaging device that captures images of the vehicle interior and functions as a sensor to acquire the status of the occupant in the vehicle cabin. The microphone 13 collects sound in the cabin. The light emitting unit 14 is composed of a long low-resolution LED installed across in the vehicle body width direction under the windshield of the vehicle.

The exterior camera 11 is installed at a position where, for example, the field of view of the occupant is included in the imaging range.

The interior camera 12 is installed at a position where the eyes and hands of the occupant can be imaged. For example, the in-vehicle camera can be installed near the rear-view mirror or an interior light, or the like.

The data processing device 20 has a peripheral conditions acquisition unit 21, an occupant state recognition unit 22, a speech recognition unit 23, a target recognition unit 24, a light emission control unit 25, a parking assistance unit 26, and a destination setting unit 27. When the data processing device 20 is achieved using a computer, the CPU (central processing unit) executes a program to perform the functions of the peripheral conditions acquisition unit 21, occupant state recognition unit 22, speech recognition unit 23, target recognition unit 24, light emission control unit 25, parking assistance unit 26, and the destination setting unit 27.

The peripheral conditions acquisition unit 21 that acquires the peripheral circumstances around the vehicle. Specifically, the peripheral conditions acquisition unit 21 acquires an image captured by the exterior camera 11 that captures the surroundings of the host vehicle, the position data of the host vehicle specified by the navigation unit 40, and map data of the surroundings, and outputs to the target recognition unit 24.

The occupant state recognition unit 22 acquires images captured by the interior camera 12, and recognizes the state of the vehicle occupant. The occupant state recognized by the occupant state recognizing unit 22 includes motions of pointing outside of the vehicle. Furthermore, the occupant state recognition unit 22 recognizes the position of the occupant's eyes and the occupant's fingers. The occupant state recognition unit 22 recognizes the pointing direction from the position of the occupant's eyes and the position of the finger, and outputs the pointing direction to the target recognition unit 24.

The speech recognition unit 23 recognizes words and phrases related to the target from the speech of the occupant. For example, words or phrases such as "parking lot", "shop", or the like that contribute to narrowing down the target pointed at by the occupant may be recognized.

The target recognition unit 24 recognizes the target pointed at by the occupant using the surrounding condition, the pointing direction, and the words or phrases included in the speech.

First, the target recognition unit 24 identifies target candidates in the surroundings of the vehicle and the relative direction of the target candidate with respect to the host vehicle.

For example, the target recognition unit 24 can perform image processing on the image from the exterior camera 11 to recognize a parking region or the like where the host vehicle can be parked as a target candidate, and can specify the relative direction from the position in the image.

Furthermore, the target recognition unit 24 can identify the target candidates and relative direction by generating 3D model data of the facilities surrounding the host vehicle using position data of the host vehicle and map data of the surroundings. Note that the facility refers to an arbitrary target such as a building, store, park, or the like that can be pointed at by the occupant.

When the pointing direction and the relative direction substantially match, for example, when the angle difference between the pointing direction and the relative direction is equal to or less than a prescribed value, the target recognition unit 24 recognizes that the target is the target pointed at by the occupant.

Note that recognition by the target recognition unit 24 can be performed using words and phrases included in the speech. Specifically, the target recognition unit 24 narrows down target candidates on the condition that the candidates correspond to words or phrases included in the speech, and recognizes that the target essentially matching the pointing direction and the relative direction is the target pointed at by the occupant.

The light emission control unit 25 controls the light emission of the light emitting unit 14 based on the recognition results by the occupant state recognition unit 22 and the recognition results by the target recognition unit 24. The light emission control unit 25 controls, in at least two stages, the luminescence mode of a portion of the light emitting unit 14 corresponding to the direction pointed at by the occupant and the direction where the target is located, and provides feedback as to how the occupant's pointing is recognized.

The light emission control unit 25 can change the luminescence mode depending on whether or not the occupant state recognition unit 22 has recognized the pointing direction (the direction pointed at by the occupant). In addition, the light emission control unit 25 can change the luminescence mode depending on whether or not the target recognition unit 24 has recognized the pointing target (the target pointed at by the occupant).

As an example, when the occupant state recognition unit 22 recognizes the pointing direction, the light emission control unit 25 causes a portion of the light emitting unit 14 including the pointing direction to emit light in a band of width L1. Thereafter, when the target recognition unit 24 recognizes the pointing target, the light emission control unit 25 causes a portion of the light emitting unit 14 including the direction where the pointing target is located to emit light in a band with a width L2 which is narrower than the width L1.

The parking assistance unit 26 assists parking in the parking region when the target recognition unit 24 recognizes the parking region as the target, and a prescribed confirmation operation is received. Specifically, the parking assistance unit 26 outputs an operation instruction to a drive control unit 30 based on the data indicating the position of the parking region output by the target recognition unit 24. The operation instruction is an instruction for controlling acceleration/deceleration and steering of the host vehicle. When the drive control unit 30 operates in response to the operation instruction, the host vehicle automatically travels to the parking region and stops.

If the target recognition unit 24 recognizes a facility as the target and receives a prescribed confirmation operation, the destination setting unit 27 outputs the facility as a destination to the navigation unit 40. The navigation unit 40 searches for a route leading to the acquired destination and provides guidance on the searched route.

FIG. 3 is an explanatory diagram of control of the luminescence mode. As depicted in FIG. 3, the stages of pointing recognition are classified as: (1) a stage of recognizing the occupant's hand, (2) a stage of recognizing the finger pointing gesture, (3) a stage of recognizing the pointing direction, and (4) a stage of recognizing the pointing target. The light emission control unit 25 assigns different luminescence modes to these stages in order to inform the occupant of the progress of recognition.

In pattern 1 depicted in FIG. 3, the light emission control unit 25 controls the light emitting unit 14 so as not to emit light until stage (2) in which the finger pointing gesture is recognized. In stage (3) where the pointing direction is recognized, the light emission control unit 25 controls the light emitting unit 14 so that the light emitting unit 14 emits light during the first luminescence mode. In stage (4) where the pointing target is recognized, the light control unit 25 controls the light emitting unit 14 so that the light emitting unit 14 emits light during the second luminescence mode.

In pattern 2, the light emission control unit 25 controls the light emitting unit 14 so as not to emit light until stage (1) in which the occupant's hand is recognized. In stage (2) where the finger pointing gesture is recognized and stage (3) where the pointing direction is recognized, the light emission control unit 25 controls the light emitting unit 14 so that the light emitting unit 14 emits light during the first luminescence mode. In stage (4) where the pointing target is recognized, the light emission control unit 25 controls the light emitting unit 14 so that the light emitting unit 14 emits light during the second luminescence mode.

In pattern 3, the light emission control unit 25 controls the light emitting unit 14 so as not to emit light until stage (1) in which the occupant's hand is recognized. In stage (2) where the finger pointing gesture is recognized, the light emission control unit 25 controls the light emitting unit 14 so that the light emitting unit 14 emits light during the first luminescence mode. In stage (3) where the pointing direction is recognized and stage (4) where the pointing target is recognized, the light emission control unit 25 controls the light emitting unit 14 so that the light emitting unit 14 emits light during the second luminescence mode.

In pattern 4, the light emission control unit 25 controls the light emitting unit 14 so as not to emit light until stage (1) in which the occupant's hand is recognized. In stage (2) where the finger pointing gesture is recognized, the light emission control unit 25 controls the light emitting unit 14 so that the light emitting unit 14 emits light during the first luminescence mode. In stage (3) where the pointing direction is recognized, the light emission control unit 25 controls the light emitting unit 14 so that the light emitting unit 14 emits light during the second luminescence mode. In stage (4) where the pointing target is recognized, the light emission control unit 25 controls the light emitting unit 14 so that the light emitting unit 14 emits light during the third luminescence mode.

The luminescence mode can be set by combining arbitrary elements such as light emission width, blinking, color, brightness, and the like. The position of light emission can also be arbitrarily controlled, but it is preferable to partially emit light at the position corresponding to the pointing direction or the direction of the target, when considering that it is feedback about pointing.

Figure 4:
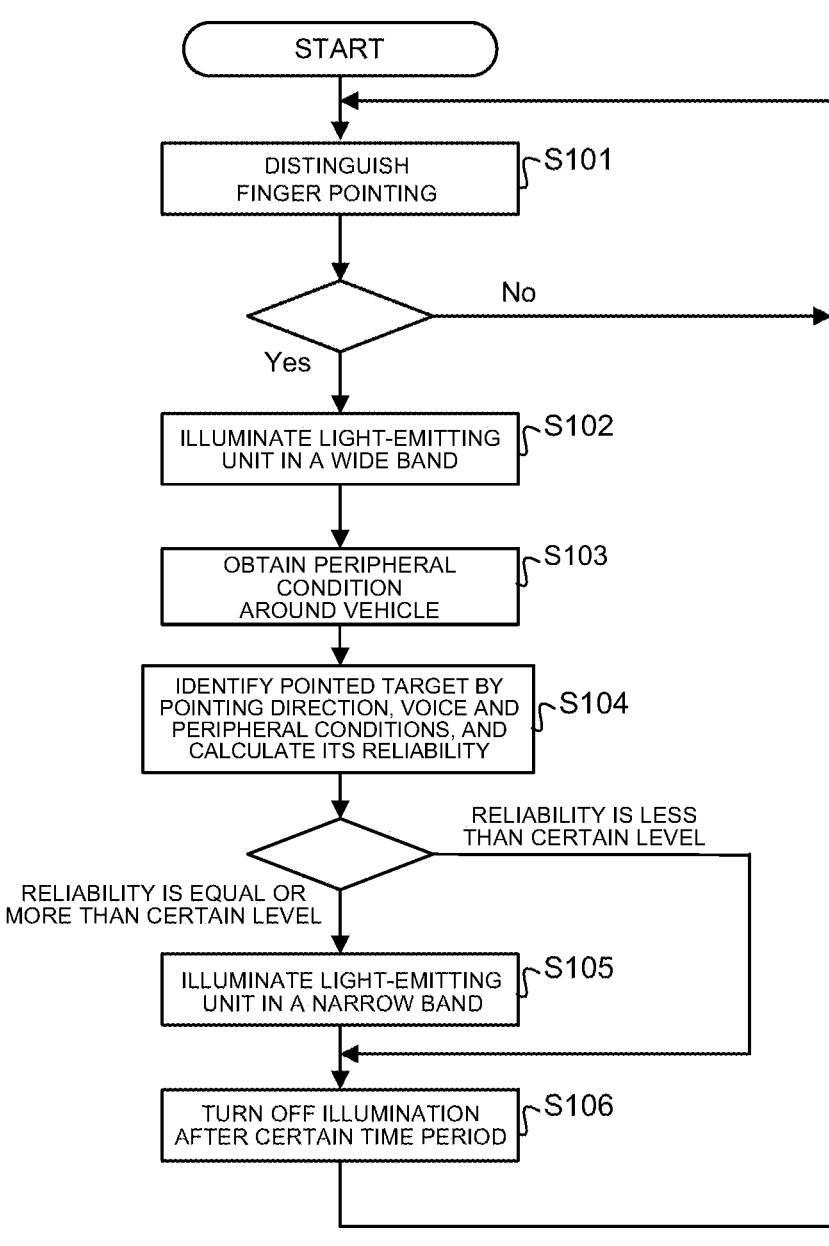
FIG. 4 is a flowchart for describing light emission control.

FIG. 4 is a flowchart for explaining light emission control during pattern 1. The data processing device 20 repeatedly executes the operations of the following steps S101 to S106.

Step S101: The occupant state recognition unit 22 recognizes the occupant state and distinguishes whether or not the occupant is performing a finger pointing gesture. If the occupant has not performed the finger pointing gesture or the pointing direction cannot be distinguished, step S101 is repeated. If the occupant has performed the finger pointing gesture and the pointing direction has been identified, the process proceeds to step S102.

Step S102: The light emission control unit 25 causes a portion of the light emitting unit 14 including the pointing direction to be illuminated in a wide band. Thereafter, the process proceeds to step S103.

Step S103: The peripheral conditions acquisition unit 21 acquires the image from the exterior camera 11, the position data, the map data of the surroundings, and the like, as the surroundings, and the process proceeds to step S104.

Step S104: The target recognition unit 24 identifies the pointing target from the pointing direction, speech, and the peripheral conditions. Furthermore, the reliability of the identification of the pointing target is calculated. If the reliability is equal to or greater than a certain value, the process proceeds to step S105, and if the reliability is less than the certain value, the process proceeds to step S106.

Step S105: The light emission control unit 25 causes a portion of the light emitting unit 14 including the direction of the pointing target to be illuminated in a narrow band. Thereafter, the process returns to step S106.

Step S106: The light emission control unit 25 ends the illumination after a predetermined period of time, and the process returns to step S101.

In the above description, a low-resolution LED is used as the light emitting unit 14. However, the light emitting unit 14 may be a head-up display installed on the windshield. When a head-up display is used, projection is performed such that the vicinity of the lower edge of the windshield is illuminated in a prescribed luminescence mode. As another example of the light emitting unit 14, a long liquid crystal display installed under the windshield across the vehicle body width direction may be used. In this case, an upper portion of the display region of the liquid crystal display is used as the light emitting unit 14. As another example of the light emitting unit 14, the light emitting unit 14 may be installed on the upper side of the windshield.

The recognition results of the target can be used not only for automatic parking or setting a destination, but also for any arbitrary purpose. For example, information about a target may be provided, or automatic travel control for tracking a target vehicle may be performed. It is also possible to adopt a configuration in which information is only provided for assisting the driving operation for parking.

As described above, the disclosed data processing device 20 includes an occupant state recognition unit 22 that recognizes a motion of a vehicle occupant pointing to the outside of the vehicle, a peripheral conditions acquisition unit 21 that acquires the peripheral circumstances around the vehicle, a target recognition unit 24 that recognizes a target pointed at by the occupant based on recognition results of the occupant state recognition unit 22 and acquisition results of the peripheral conditions acquisition unit 21, and a light emission control unit 25 connected to an elongated light emitting unit installed above or below a windshield of the vehicle across a vehicle body width direction, and configured to control a luminescence mode of a portion of the light emitting unit 14 corresponding to a direction pointed to by the occupant and/or a direction in which the target is located in at least two stages, based on recognition results of the occupant state recognition unit and/or recognition results of the target recognition unit. With this configuration and operation, it is possible to provide suitable feedback with respect to a finger pointing gesture by the occupant of the vehicle.

Furthermore, as an example, the light emission control unit 25 changes the luminescence mode depending on whether or not the occupant state recognition unit 22 recognizes a direction pointed at by the occupant. Furthermore, as an example, the light emission control unit 25 changes the luminescence mode depending on whether or not the target recognition unit 24 recognizes a target pointed at by the occupant. In this manner, the data processing device 20 can provide feedback on the progress of recognition of pointing using a change in the luminescence mode.

Specifically, the light emission control unit 25 illuminates a portion of the light emitting unit 14 including the direction pointed at by the occupant across a first width, when the occupant state recognition unit 22 recognizes the direction pointed by the occupant. The light emission control unit 25 illuminates a portion of the light emitting unit 14 including a direction in which the target is located across a second width, when the target recognition unit 24 recognizes the target pointed at by the occupant. The second width is narrower than the first width.

By changing the width of the light emission in this manner, it is possible to easily provide feedback to the occupant concerning progress of the recognition of pointing. In particular, since the change in the width of the emitted light can be sufficiently confirmed even in the peripheral vision field, feedback can be provided without obstructing the visual confirmation of the surroundings by the occupant.

The light emitting unit 14 is, for example, a low-resolution LED (Light Emitting Diode). Since feedback by the light emitting unit 14 does not require output of detailed information, a low-resolution LED is suitable. Low-resolution LEDs can also be used for the vehicle interior. Of course, a high-resolution LED may be used as the light emitting unit 14, and the light emission control unit 25 may perform control to illuminate the high-resolution LED at a low resolution.

Furthermore, the light emitting unit 14 is, for example, a head-up display installed on the windshield. The head-up display can be used in common for providing both various information and feedback regarding pointing.

Furthermore, the configuration may further include a parking assistance unit 26 that assists parking in a parking region by having the peripheral conditions acquisition unit 21 acquire an image from a camera that captures the surroundings of the vehicle, and the target recognition unit 24 recognizes a parking region in which the vehicle can be parked from the image as the target. With this configuration, it is possible to assist parking in a parking region pointed at by the occupant.

Furthermore, the configuration may further include a destination setting unit 27 that sets a facility as the destination by having the peripheral conditions acquisition unit 21 acquire map data of the surroundings of the vehicle and the target recognition unit 24 recognize the facility included in the map data as the target. With this configuration, it is possible to easily perform guidance to the facility pointed at by the occupant.

Note that the present invention is not limited to the abovementioned examples and includes various modified examples. For example, while the abovementioned examples have been described in detail in order to describe the present invention in an easy-to-understand manner, the present invention is not necessarily limited to those with all the described configurations. Any of these configurations may be deleted, or any configuration may be added or replaced.

For example, if there are a passenger, the present invention may be applied to the passenger. A specific occupant among the plurality of occupants may also be designated as the occupant to whom the present invention is applied.

The status of the occupant may also be acquired from an arbitrary sensor other than the vehicle interior camera, such as LIDAR (Light Detection and Ranging, Laser Imaging Detection and Ranging), a stationary smartphone, or the like. Furthermore, the outputs of a plurality of sensors and a plurality of types of sensors can be combined.

Furthermore, in the example described above, a line extending from the eyes and fingertips was determined as the direction in which the occupant is pointing, but it is also possible to recognize two points on the fingers and determine that a line extending between these two points is the direction in which the occupant is pointing.

DESCRIPTION OF SYMBOLS

+10. In-vehicle system, 11. Exterior camera, 12. Interior camera, 13. Microphone, 14. Light emitting unit, 20. Data processing device, 21. peripheral conditions acquisition unit, 22. Occupant state recognition unit, 23. Speech recognition unit, 24. Target recognition unit, 25. Light emission control unit, 26. Parking assistance unit, 27. Destination setting unit, 30. Drive control unit, 40. Navigation unit

What is claimed is:

1. A data processing device mounted on a vehicle, comprising:
   an occupant state recognition unit that recognizes motion of an occupant of the vehicle pointing to outside of the vehicle;
   a peripheral conditions acquisition unit that acquires peripheral conditions around the vehicle;

a target recognition unit that recognizes a target pointed at by the occupant based on the recognition result obtained by the occupant state recognition unit and the recognition result obtained by the peripheral conditions acquisition unit; and a light emission control unit connected to an elongated light emitting unit installed above or below a windshield of the vehicle over a width direction of the vehicle, and configured to control a luminescence mode in a portion of the elongated light emitting unit corresponding to the direction pointed to by the occupant or the direction in which the target is located in at least two stages based on the recognition result of the occupant state recognition unit or the recognition result of the target recognition unit, wherein in the control with at least two stages, a width of a portion of the light emitting unit that emits light varies depending on a recognition stage of the occupant state recognition unit and/or a recognition stage of the target recognition unit.

2. The data processing device according to claim 1, wherein, the light emission control unit changes the luminescence mode depending on whether or not the occupant state recognition unit recognizes a direction pointed at by the occupant.

3. The data processing device according to claim 1, wherein, the light emission control unit changes the luminescence mode depending on whether or not the target recognition unit recognizes a target pointed at by the occupant.

4. The data processing device according to claim 3, wherein the light emission control unit illuminates a portion of the elongated light emitting unit including the direction pointed at by the occupant across a first width when the occupant state recognition unit recognizes the direction pointed by the occupant, and illuminates a portion of the light emitting unit including a direction in which the target is located across a second width when the target recognition unit recognizes the target pointed at by the occupant; the second width is narrower than the first width.

5. The data processing device according to claim 1, further comprising a parking assistance unit that assists parking in a designated parking region;

wherein the peripheral conditions acquisition unit acquires an image from a camera that captures an image of surroundings of the vehicle; and the target recognition unit recognizes a parking region in which the vehicle can park from the image as the target and outputs the recognized parking region to the parking assistance unit.

6. The data processing device according to claim 1, further comprising a destination setting unit that sets a specified facility as a destination;

wherein the peripheral conditions acquisition unit acquires map data around the vehicle; and the target recognition unit recognizes a facility included in the map data as a target and outputs the recognized facility to the destination setting unit.

7. A method for recognizing motions of an occupant in a vehicle and providing feedback to the occupant, comprising:

a first step of recognizing a motion of an occupant pointing outside the vehicle;

a second step of acquiring peripheral conditions around the vehicle;

a third step of recognizing a target pointed at by the occupant based on the recognition result by the first step and the acquisition result by the second step; and a fourth step of controlling a luminescence mode in a portion of a light emitting unit in at least two stages, the light emitting unit has an elongated shape and installed above or below a windshield of the vehicle over a width direction of the vehicle, the portion is controlled to corresponds to the direction pointed at by the occupant or the direction in which the target is located based on the recognition result by the first step or the recognition result by the third step, wherein in the control with at least two stages, a width of a portion of the light emitting unit that emits light varies depending on a recognition stage of the occupant state recognition unit and/or a recognition stage of the target recognition unit.

* * * * *